(12) United States Patent
Matsuo et al.

(10) Patent No.: US 8,483,195 B2
(45) Date of Patent: Jul. 9, 2013

(54) WIRELESS COMMUNICATION APPARATUS AND WIRELESS COMMUNICATION METHOD

(75) Inventors: Ryoko Matsuo, Tokyo (JP); Tomoya Tandai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 699 days.

(21) Appl. No.: 12/561,447

(22) Filed: Sep. 17, 2009

(65) Prior Publication Data

US 2010/0226349 A1 Sep. 9, 2010

(30) Foreign Application Priority Data

Mar. 3, 2009 (JP) .................................. 2009-49145

(51) Int. Cl.
*H04W 4/00* (2009.01)
*H04B 7/00* (2006.01)

(52) U.S. Cl.
USPC .......................................... 370/338; 370/320

(58) Field of Classification Search
USPC ................................................. 370/338, 320
See application file for complete search history.

(56) References Cited

U.S. PATENT DOCUMENTS 7,298,691 B1 * 11/2007 Yonge et al. .................. 370/203
7,471,693 B2 * 12/2008 Petrovic et al. ............... 370/444
2005/0027948 A1 * 2/2005 Marlan et al. ................. 711/150
2006/0026491 A1 * 2/2006 Shoemake et al. ............ 714/776
2007/0300120 A1 * 12/2007 Kim et al. ..................... 714/749
2008/0301516 A1 * 12/2008 Han et al. ...................... 714/748
2008/0304430 A1 * 12/2008 Zhuyan ......................... 370/278
2009/0046626 A1 * 2/2009 Shao et al. .................... 370/320
2009/0201928 A1 * 8/2009 Chen et al. .................... 370/390
2009/0276674 A1 * 11/2009 Wei et al. ...................... 714/749

FOREIGN PATENT DOCUMENTS
JP 4110522 4/2008

* cited by examiner

*Primary Examiner* — Mark Rinehart
*Assistant Examiner* — Angel Brockman
(74) *Attorney, Agent, or Firm* — Finnegan, Henderson, Farabow, Garrett & Dunner, L.L.P.

(57) ABSTRACT

A wireless communication apparatus has a transmission unit that transmits a transmit signal in a condition where either acknowledgement or negative acknowledgement is set therein, a reception unit that receives a response signal in response to the transmission signal, a counter that counts the number of times the reception unit has not received the negative acknowledgment signal in response to the transmission signal in which the negative acknowledgement is set, and a control unit that causes the transmission unit to set the negative acknowledgement if a count value of the counter is less than a predetermined value and, if the count value is equal to or larger than the predetermined value, causes the transmission unit to set the acknowledgement.

18 Claims, 11 Drawing Sheets

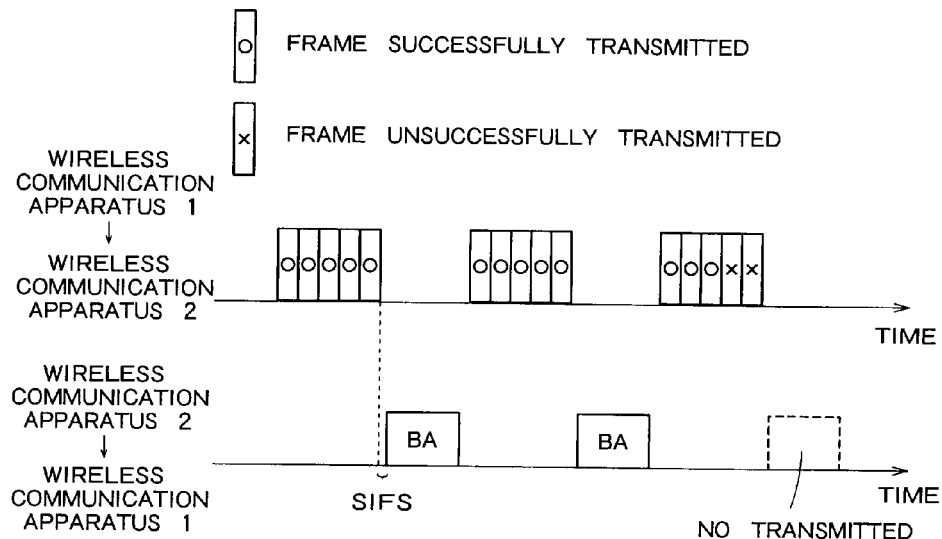
F I G. 3
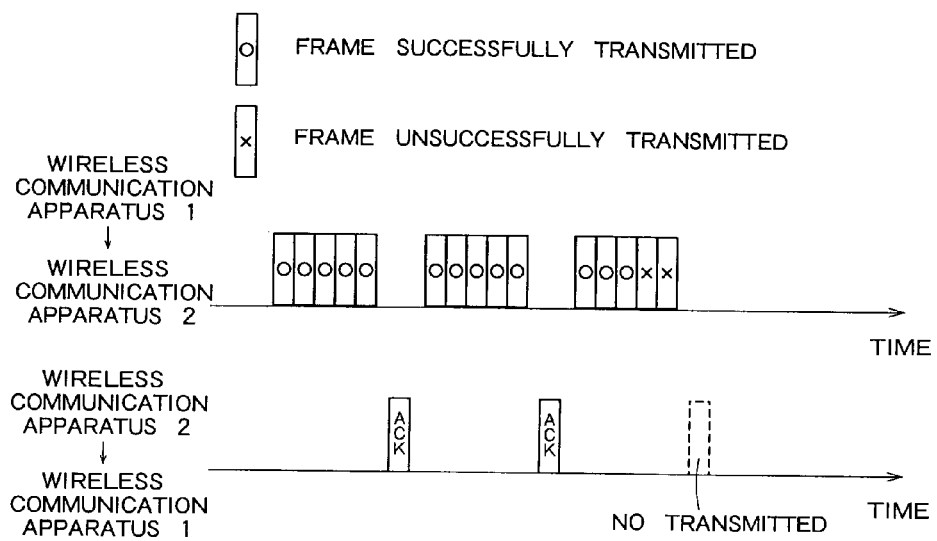
F I G. 4

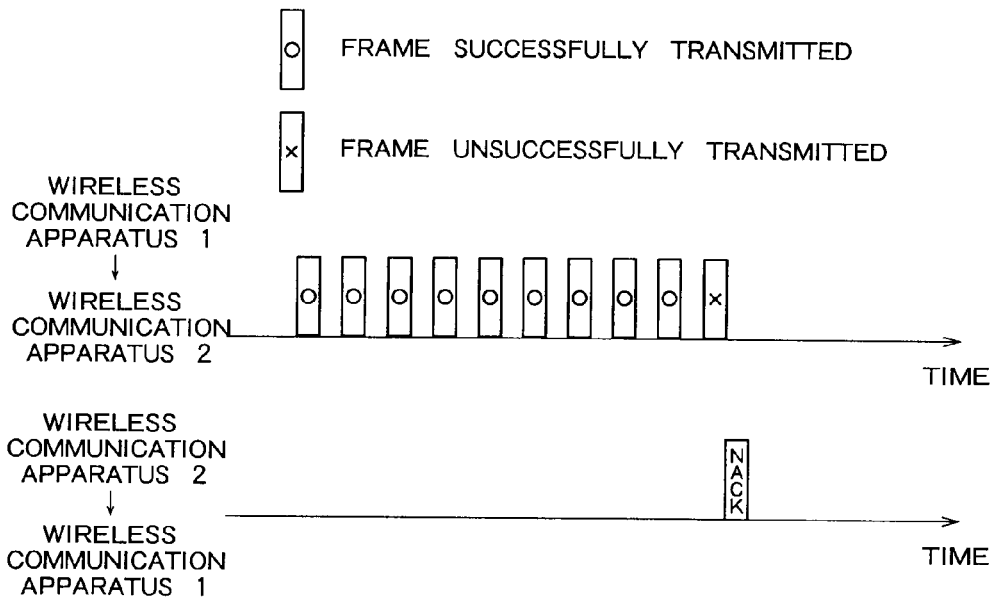
F I G. 5
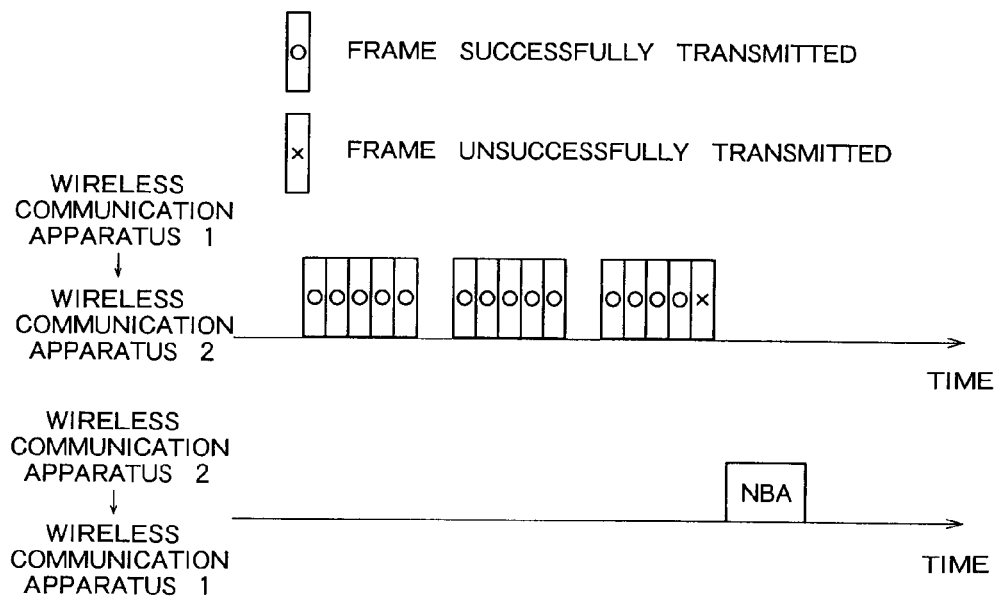
F I G. 6

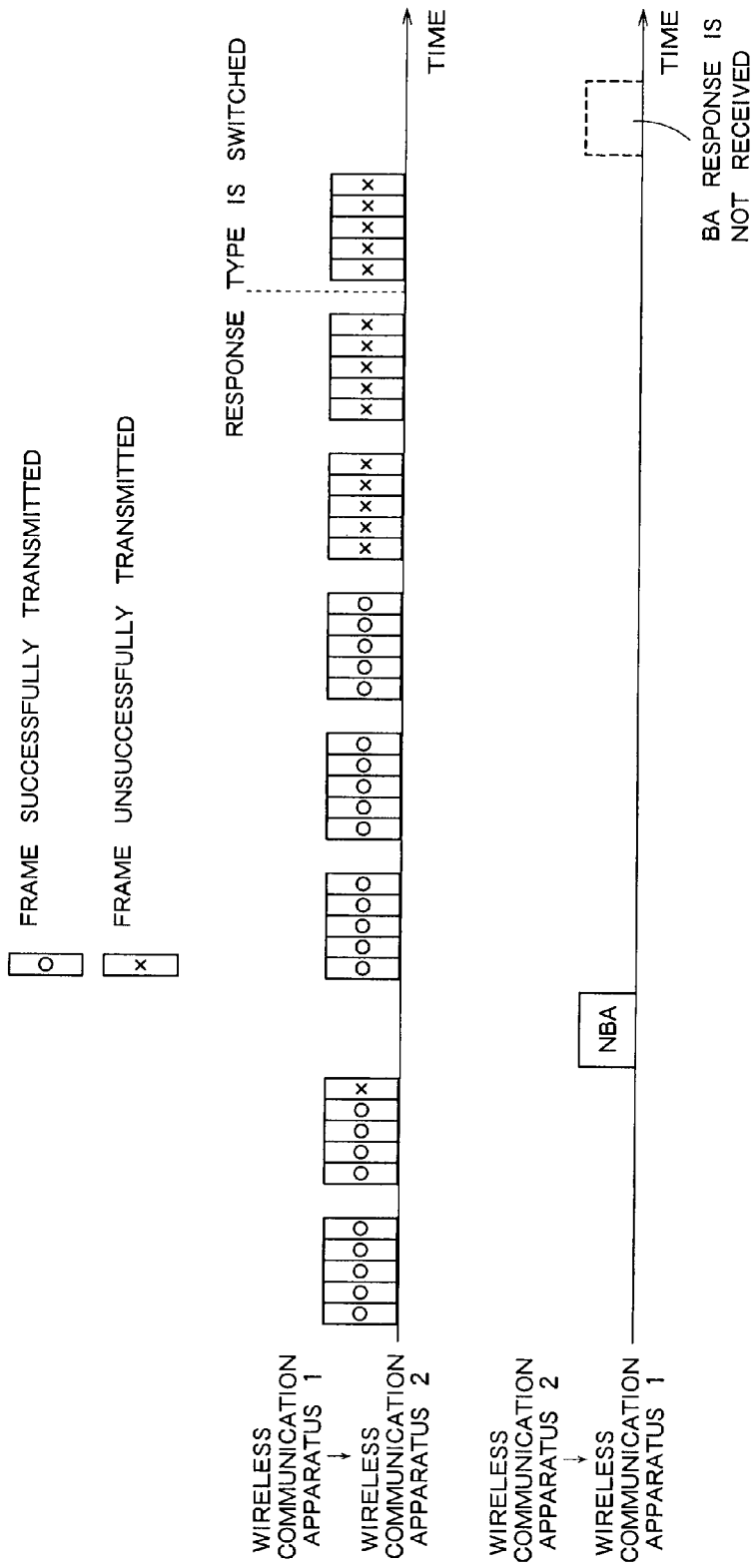
F I G. 9

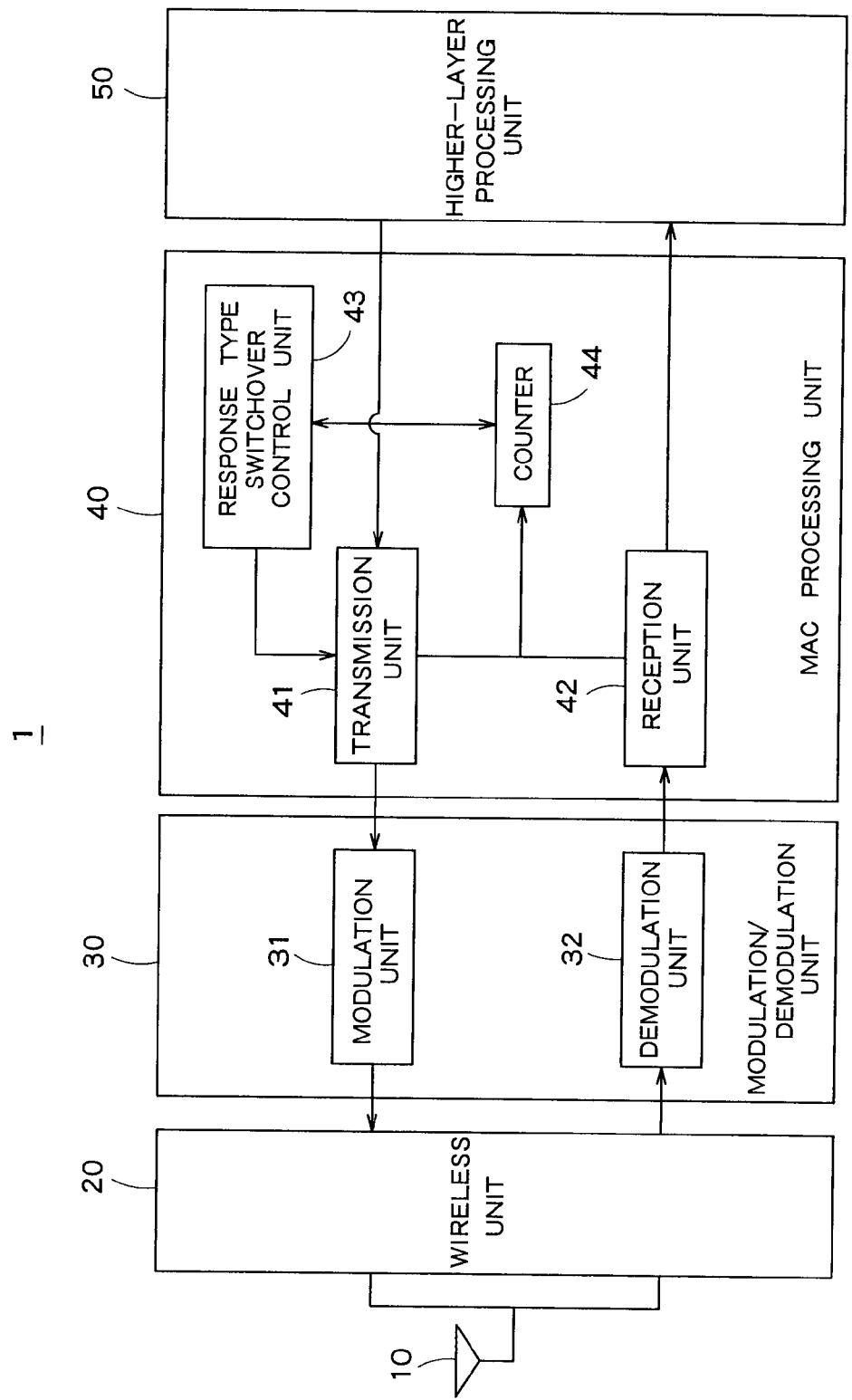
F I G. 10

WIRELESS COMMUNICATION APPARATUS AND WIRELESS COMMUNICATION METHOD

CROSS REFERENCE TO RELATED APPLICATION

This application is based upon and claims benefit of priority from the Japanese Patent Application No. 2009-49145, filed on Mar. 3, 2009, the entire contents of which are incorporated herein by reference.

BACKGROUND OF THE INVENTION

The present invention relates to a wireless communication apparatus and a wireless communication method.

The wireless local area network (wireless LAN) represented by the conventional 802.11a/b/g has employed the access control system based on carrier sense multiple access/collision avoidance (CSMA/CA). By CSMA/CA, each of wireless devices measures and detects the occupancy state of a wireless channel before using it and, only when none of the other wireless devices is transmitting, transmits frames. If collision occurs, the wireless device interrupts the transmission to set back-off at random and retransmits the frames. This enables equally allocating a frequency band to the wireless devices. Further, in response to the frames received, the transmission is confirmed by giving or not giving acknowledgement (ACK) or block ACK.

On the other hand, consider short-distance communication over a communication range of up to about several tens of centimeters: in such a case, only terminals present in this communication range will be influenced, so that the aforementioned approach may preferably be replaced by such an expected approach as to be easier and more efficient in connection.

To improve access efficiency at the terminal in a case where one-to-one communication is assumed, rather than using ACK as in the case of the conventional wireless LAN, it is more effective to transmit a response from the reception device only if frame transmission failed, that is, use only negative acknowledgement (NACK) (see, for example, Japanese Patent No. 4110522). Use of NACK enables transmitting frames in sequence if the channel status is good, thereby improving access efficiencies.

However, if an acute channel change has resulted in sudden break-up of communication between one wireless device and its communication-destination wireless device so that no transmission frames may be sent to this destination, the transmission-destination wireless device does not recognize the presence of the transmission frames and so does not transmits NACK, so that the transmission-source wireless device does not receive NACK. This has caused a problem that the transmission-source wireless device may not sense a change in status and might mistakenly recognize that communication had been successful in good channel status and so continue the communication.

There has been another problem that if the channel status got worse, NACK may occur at a higher frequency, thus preventing access efficiencies from being improved. Moreover, if the occurrence frequency of NACK suddenly rose to a high value and then lowered to 0 suddenly, it has been difficult to identify the phenomenon.

SUMMARY OF THE INVENTION

According to one aspect of the present invention, there is provided a wireless communication apparatus comprising:

a transmission unit that transmits a transmit signal in a condition where either acknowledgement or negative acknowledgement is set therein;

a reception unit that receives a positive acknowledgment signal or a negative acknowledgment signal in response to the transmission signal;

a counter that counts the number of times the reception unit has not received the negative acknowledgment signal in response to the transmission signal in which the negative acknowledgement is set; and a control unit that causes the transmission unit to set the negative acknowledgement if a count value of the counter is less than a predetermined value and, if the count value is equal to or larger than the predetermined value, causes the transmission unit to set the acknowledgement.

According to one aspect of the present invention, there is provided a wireless communication apparatus comprising:

a transmission unit that transmits a transmission signal in a condition where either acknowledgement or negative acknowledgement is set therein;

a reception unit that receives a positive acknowledgment signal or a negative acknowledgment signal in response to the transmission signal;

a first counter that counts the number of times the reception unit has received the negative acknowledgement signal in response to the transmission signal in which the negative acknowledgement is set;

a second counter that counts the number of times the reception unit has received the positive acknowledgment signal in response to the transmission signal in which the acknowledgement is set; and a control unit that causes the transmission unit to set the negative acknowledgement if a count value of the first counter is less than a first predetermined value or the count value of the second counter is a second predetermined value or larger and, if the count value of the first counter is the first predetermined value or larger and the count value of the second counter is less than the second predetermined value, causes the transmission unit to set the acknowledgement.

According to one aspect of the present invention, there is provided a wireless communication method comprising:

transmitting a first signal in a condition where negative acknowledgement is set as a response type therein;

counting the number of times a negative acknowledgment signal has not been received in a row in response to the first signal;

if the number of times has reached a predetermined value, transmitting a second signal in a condition where acknowledgement is set as the response type therein;

if the positive acknowledgment signal is received in response to the second signal, transmitting a third signal in a condition where negative acknowledgement is set as the response type therein; and if the positive acknowledgment signal is not received in response to the second signal, retransmitting the second signal in a condition where acknowledgement is set as the response type therein.

BRIEF DESCRIPTION OF THE DRAWINGS

FIG. 3 is a chart showing one example of frame transmission by use of BA;

FIG. 4 is a chart showing one example of frame transmission by use of ACK;

FIG. 5 is a chart showing one example of frame transmission by use of NACK;

FIG. 6 is a chart showing one example of frame transmission by use of NBA;

FIG. 9 is a chart showing another example of frame transmission according to the first embodiment;

FIG. 10 is a schematic constitution diagram of a wireless communication apparatus according to the first embodiment;

DESCRIPTION OF THE EMBODIMENTS

A description will be given of embodiments of the present invention with reference to the drawings.
(First Embodiment)

Figure 1:
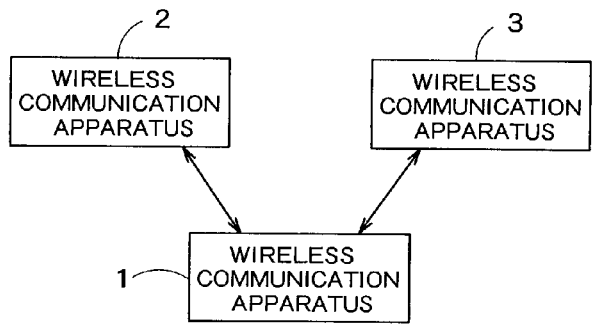
FIG. 1 is a schematic constitution diagram of a wireless communication system according to a first embodiment.

FIG. 1 shows the schematic constitution of a wireless communication system according to the first embodiment of the present invention. The wireless communication system includes wireless communication apparatuses 1 to 3. Although FIG. 1 shows the three wireless communication apparatuses, the number of the wireless communication apparatuses employed is not limited to it. The wireless communication system according to the present embodiment assumes short-distance communication over a communication range of up to about several tens of centimeters. By the wireless communication system, for example, the wireless communication apparatus 1 conducts one-to-many or one-to-one communication with the wireless communication apparatuses 2 and 3.

Now, as one example of communication in the wireless communication system, a case where the wireless communication apparatus 1 transmits frames to the wireless communication apparatus 2 will be considered. First, the wireless communication apparatus 1 transmits a connect request signal (Connect Request) to start connection. Then, when having received a connect response signal from the wireless communication apparatus 2, the wireless communication apparatus 1 recognizes that the connection has been established and transmits the frames.

The wireless communication apparatus 1 determine whether the frames have been transmitted to the wireless communication apparatus 2 properly, based on the response from the wireless communication apparatus 2. This response may come in either acknowledgement or negative acknowledgement.

Acknowledgement is transmitted to the wireless communication apparatus 1 if the wireless communication apparatus 2 could receive frames. If having received acknowledgement, the wireless communication apparatus 1 can confirm successful transmission of the frames and, if not having received it, failed transmission of the frames.

Figure 2:
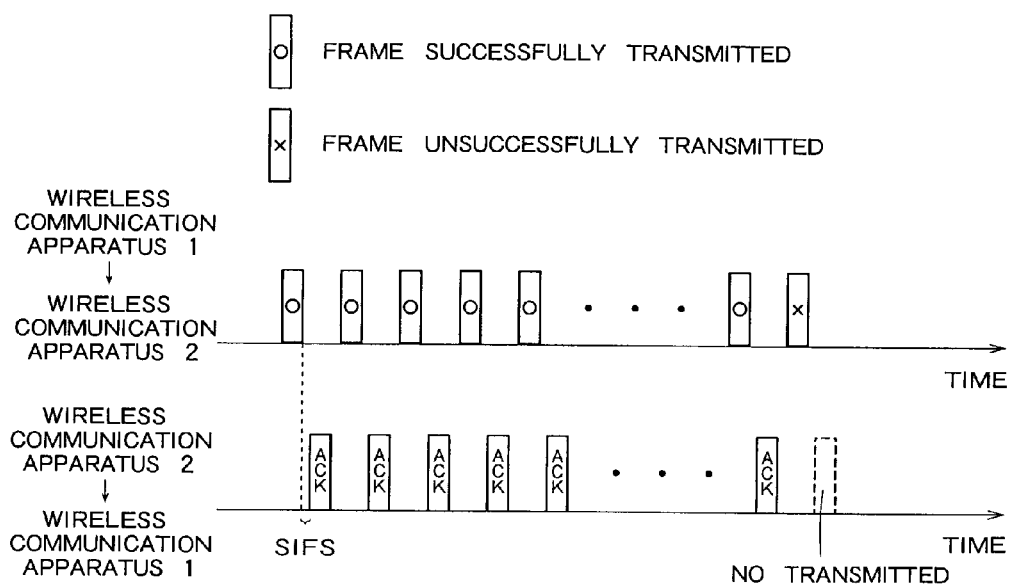
FIG. 2 is a chart showing one example of frame transmission by use of ACK.

Acknowledgement may come in either ACK or Block ACK (hereinafter referred to as BA). In communication by use of ACK, as shown in FIG. 2, frames are transmitted one by one so that ACK may be transmitted each time the frame could be received.

In communication by use of BA, as shown in FIG. 3, a plurality of frames are transmitted in sequence so that BA may be transmitted if any one of these multiple frames could be received. That is, BA means to transmit ACK's in block in response to a plurality of frames. BA is used to notify of confirmation of the transfer of each frame.

The transmission of frames and the transmission of ACK or BA (hereinafter referred to as ACK/BA) are repeated at a short constant time interval referred to as a short interframe space (SIFS).

It is to be noted that as shown in FIG. 4, ACK can be transmitted in response to a plurality of frames transmitted in sequence. In this case, ACK is transmitted if the plurality of frames could all be received. Further, in general, transmission frames are assigned numbers (sequence numbers) that indicate their sequences. If ACK is capable of describing sequence numbers, the most recent one of the sequence numbers added to the successfully received frames may be described in ACK to then notify the frame transmission source of it.

Negative acknowledgement is transmitted to the wireless communication apparatus 1 if the wireless communication apparatus 2 could not received frames. If having received negative acknowledgement, the wireless communication apparatus 1 can confirm failed transmission of the frames and, if not having received it, successful transmission of the frames.

Negative acknowledgement may come in either negative ACK (hereinafter referred to as NACK) or negative Block ACK (hereinafter referred to as NBA). In communication by use of NACK, as shown in FIG. 5, frames are transmitted one by one so that NACK may be transmitted if the frames could not be received.

In communication by use of NBA, as shown in FIG. 6, a plurality of frames are transmitted in sequence so that NBA may not be transmitted if these multiple frames could all be received and that NBA may be transmitted if any one of these multiple frames could not be received. NBA is used to confirm the transfer of each frame, so that the wireless communication apparatus 1 can understand which one of the plurality of frames could not be transmitted.

In a case of performing communication by use of NACK or NBA (hereinafter referred to as NACK/NBA), if not having received a response frame, the wireless communication apparatus 1 transmits the next frame. The frames are transmitted in sequence unless the response frame is received, thus improving access efficiencies.

Figure 7:
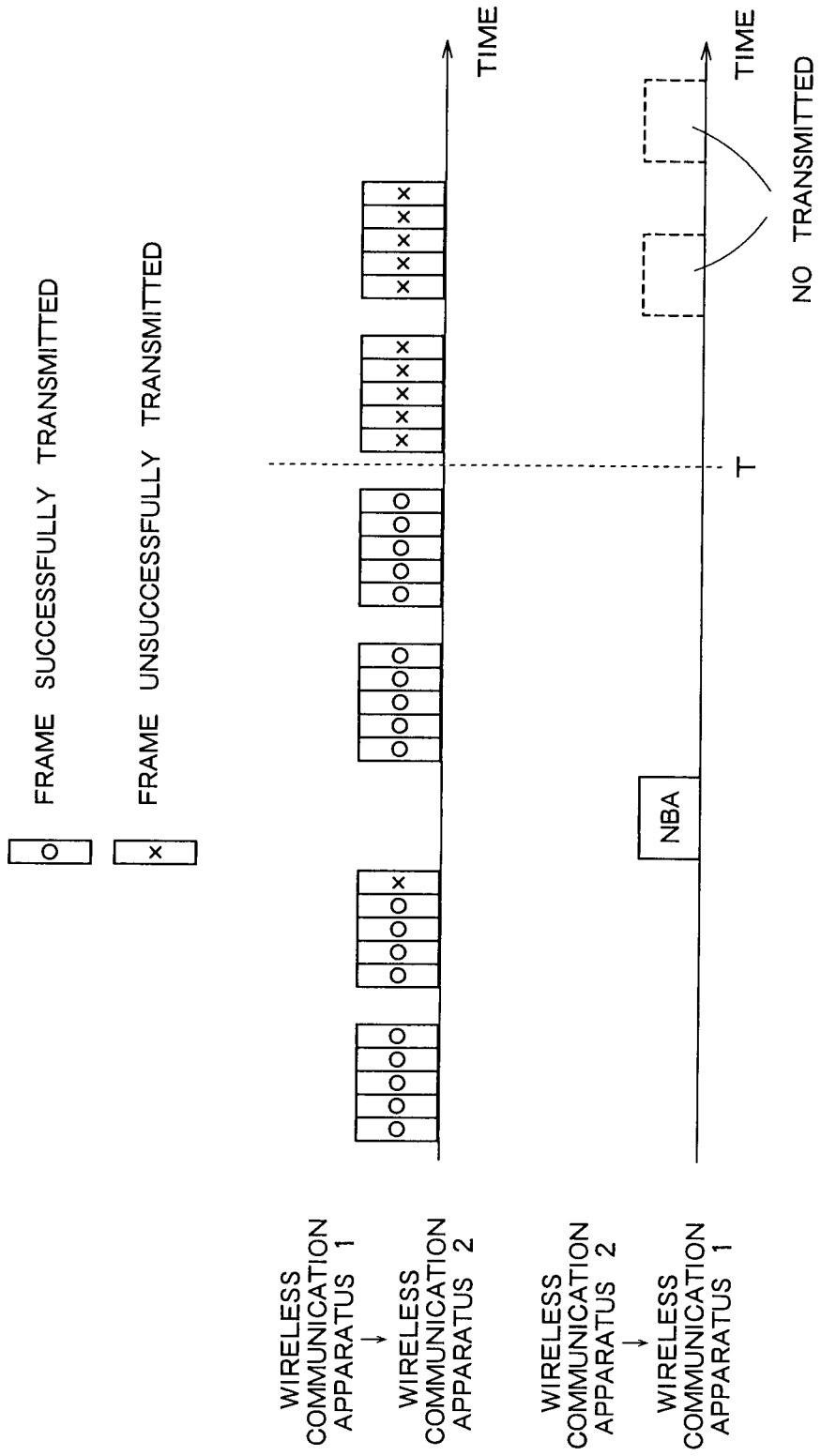
FIG. 7 is a chart showing one example of frame transmission by use of NBA.

However, the communication by use of only NACK/NBA has the following disadvantage. If the channel status has suddenly got worse due to, for example, slight movement of the wireless communication apparatus so that no transmission frames can reach the wireless communication apparatus 2 from point in time of T or later as shown in FIG. 7, the wireless communication apparatus 2 does not recognize the presence of the transmission frames and so avoids transmitting NACK/NBA. The wireless communication apparatus 1 does not receive NACK/NBA and so recognizes that the frames were transmitted successfully, thus continuing to transmit the subsequent frames.

To overcome such a disadvantage, in the present embodiment, if the wireless communication apparatus 1 transmits a plurality of frames but does not receive NACK/NBA in sequence in communication by use of NACK/NBA, the response type is switched to ACK/BA. After the switchover of the response type, if having received ACK/BA from the wireless communication apparatus 2 in response to frames transmitted thereto, the wireless communication apparatus 1 recognizes that the channel status is still good, so that the response type is switched back to NACK/NBA.

Figure 8:
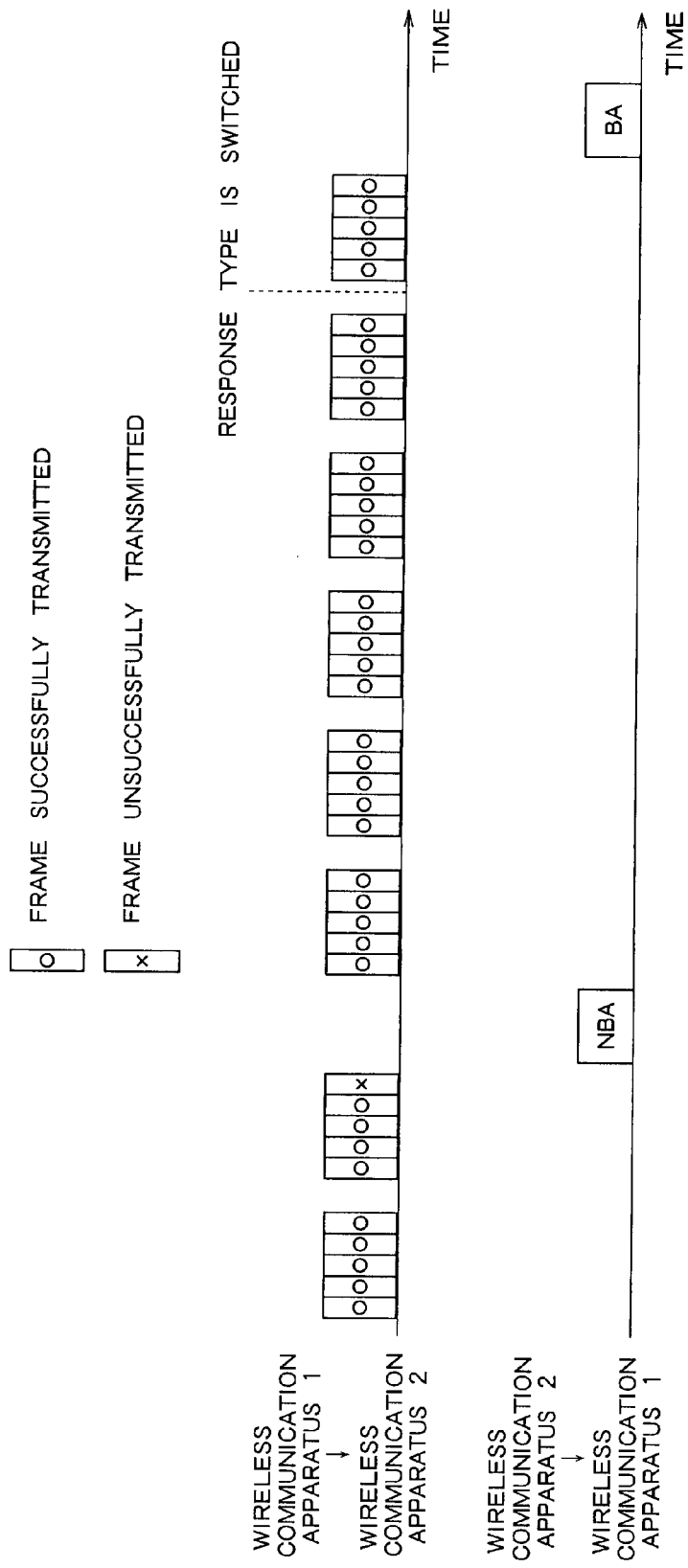
FIG. 8 is a chart showing one example of frame transmission according to the first embodiment.

An example of such frame transmission is shown in FIGS. 8 and 9. Here, a description will be given of cases where the wireless communication apparatus 1 transmits a plurality of frames sequentially. FIG. 8 shows a case where the channel status is still good and FIG. 9 shows a case where the channel status has got worse.

If the wireless communication apparatus 1 switches the response type to NBA and then transmits frames but does not receive NBA a plurality of number of times in a row (five times in this example), it switches the response type to BA. Then, the wireless communication apparatus 1 provides the BA response type and transmits the frames.

As shown in FIG. 8, if having received BA, the wireless communication apparatus 1 recognizes that NBA is not received so far because the channel status has been good and switches the response type to NACK/NBA again.

On the other hand, as shown in FIG. 9, if not having received BA within a constant lapse of time (for example, SIFS) in which response frames should reach, the wireless communication apparatus 1 can recognize that NBA is not received so far because the channel status has worsened to disable transmission of the frames to the wireless communication apparatus 2. If thus having understood the worsening of the channel status, the wireless communication apparatus 1 retransmits the frames. If communication is still impossible even after the retransmission is repeated up to a maximum trial number of times, the wireless communication apparatus 1 transmits the connect request signal, to establish connection again. It may suspend the communication.

It is to be noted that if ACK/BA is not returned even after the response type is switched from NACK/NBA to ACK/BA as described above, there may be a high possibility that NACK/NBA has not been returned immediately previously because of the worsened channel status.

Accordingly, it is preferable to set the maximum trial number of times in such a case to a value smaller than that in the case of the ordinary setting of ACK/BA. That is, the wireless communication apparatus has a first communication mode in which the response type is switched from ACK/BA to NACK/NBA and vice versa during communication and a second communication mode in which communication is carried out using only ACK/BA, wherein the maximum trial number of times is set smaller in the first communication mode than in the second communication mode. It is thus possible to reduce the number of times of wasteful retransmission to thereby rapidly shift to the establishment of connection, thus shortening the lapse of time in which frames cannot be transmitted.

FIG. 10 shows a schematic constitution of the wireless communication apparatus 1. The wireless communication apparatus 1 includes an antenna 10, a wireless unit 20, a modulation/demodulation unit 30, an MAC processing unit 40, and a higher-layer processing unit 50. The modulation/demodulation unit 30 includes a modulation unit 31 and a demodulation unit 32. The MAC processing unit 40 includes a transmission unit 41, a reception unit 42, a response type switchover control unit 43, and a counter 44.

A description will be given of operations of the wireless communication apparatus 1 when it transmits signals. Frames output from the higher-layer processing unit 50 are stored in a transmission buffer (not shown) of the transmission unit 41. The response type switchover control unit 43 determines either ACK/BA or NACK/NBA as the response type for the transmission frames and indicates it to the transmission unit 41.

The transmission unit 41 performs processing, for example, of the addition of an MAC header to the frames in the transmission buffer in order in which they were stored and outputs them to the modulation unit 31. In this case, the transmission unit 41 sets the response type indicated by the response type switchover control unit 43 into a field of the MAC header that notifies of the response type. Further, the transmission unit 41 notifies the counter 44 of frame transmission timing and the response type thus set.

The modulation unit 31 performs encoding processing, modulation processing, and physical layer-related processing such as addition of a physical header on packets received from the transmission unit 41. Subsequently, the packets are sent to the wireless unit 20, which performs D/A conversion processing and frequency conversion to the wireless communication frequency band on the packets, which are then transmitted via the antenna 10.

Next, a description will be given of operations of the wireless communication apparatus 1 when it receives signals. The wireless unit 20 performs frequency conversion to the baseband and A/D conversion processing on the signal received via the antenna 10 and outputs it to the demodulation unit 32. The demodulation unit 32 performs, for example, demodulation processing and analysis of the physical header on the signal received from the wireless unit 20 and then outputs the demodulated packets to the reception unit 42.

The reception unit 42, for example, analyzes the MAC header in the demodulated packets and, if the received packets were transmitted from the communication partner device of the wireless communication apparatus 1, outputs those packets to the higher-layer processing unit 50. Further, if the received packets were a response for the packets transmitted from the transmission unit 41, the reception unit 42 notifies the counter 44 that it has received the response.

The counter 44 determines whether NACK/NBA is received in response to transmission of the frame for which NACK/NBA is set, based on the notifications from the transmission unit 41 and the reception unit 42, and if it is not received in response, this counter is incremented and, if it is received in response, the counter is cleared.

The response type switchover control unit 43 determines the response type based on a count value of the counter 44. For example, when switching the response type to BA because NBA has not been received five times in a row in response to transmission of the frame for which response type NBA is set as shown in FIGS. 8 and 9, the response type switchover control unit 43 switches the response type when the counter 44 takes on value five.

In such a manner, when the counter 44 has reached a predetermined value, the response type switchover control unit 43 switches the response type for the transmission frame from NACK/NBA to ACK/BA. Setting of the predetermined value will be described later.

Further, if ACK/BA is returned in response to transmission of the frame for which response type ACK/BA is set, the response type switchover control unit 43 switches the response type for the transmission frame from ACK/BA back to NACK/NBA.

It is to be noted that when having received a frame transmitted from the wireless communication apparatus 1, the devices (wireless communication apparatuses 2 and 3) engaged in communication with the wireless communication apparatus 1 are assumed to detect the response type set for this frame and make a response in accordance with the detected response type.

A description will be given of such a wireless communication method by use of the wireless communication apparatus 1 with reference to the flowchart shown in FIG. 11.

In step S101, the wireless communication apparatus 1 transmits the connect request signal (C_req).

In step S102, if the wireless communication apparatus 1 has received a connect response signal (C_acc), connection is established to go to step S104. If the wireless communication apparatus 1 has not received the connect response signal (C_acc), an advance is made to step S103.

In step S103, if time is yet to run out, a return is made to step S101, and if time has run out, the processing ends.

In step S104, the count value of the counter 44 is cleared (set to 0).

In step S105, if the count value of the counter 44 (number of frames which the wireless communication apparatus 1 doesn't receive NACK/NBA in sequence) is less than a threshold value, an advance is made to step S106, and if it is equal to or more than the threshold value (has reached the threshold value), an advance is made to step S113.

In step S106, the wireless communication apparatus 1 transmits a frame in accordance with the NACK/NBA policy.

In step S107, if the wireless communication apparatus 1 has received NACK/NBA within a predetermined lapse of time since the frame transmission, an advance is made to step S109, and if it has not received NACK/NBA, an advance is made to step S108.

In step S108, the frame transmission is considered to be successful, to increment the counter 44 (increase the count value by one).

In step S109, the frame transmission is considered to have failed, to clear the counter 44 (reduce the count value to 0).

In step S110, if the number of times of the frame retransmission is less than a maximum trial number of times, an advance is made to step S111, and if it has reached that maximum value, the transmission of this frame is abandoned, to go to step S112. The number of times of the retransmission can be counted by the communication unit 41.

In step S111, the wireless communication apparatus 1 retransmits the frame in accordance with the NACK/NBA policy.

In step S112, if there is data to be transferred, a return is made to step S105, and if there is no data to be transferred, the processing ends.

In step S113, the wireless communication apparatus 1 switches the response type to the ACK/BA policy and then transmits the frame.

In step S114, if the wireless communication apparatus 1 has received ACK/BA within the predetermined lapse of time since the frame transmission at S113, an advance is made to step S115, and if it has not received ACK/BA, an advance is made to step S117.

In step S115, if a sequence number is described in ACK/BA, a determination is made as to whether this sequence number is correct. For example, a determination is made as to whether the sequence number described in ACK agrees with the most recent one of the sequence numbers assigned to the frames transmitted by the wireless communication apparatus 1.

If the sequence number is correct, an advance is made to step S116, and if it is not correct, an advance is made to step S117.

If no sequence number is described in ACK, this step is omitted.

In step S116, the counter 44 is cleared (the count value is reduced to 0).

In step S117, a determination is made as to whether the frame can be retransmitted. For example, if this frame is stored in the transmission buffer, it is determined to be able to be retransmitted, and if the frame is erased already, it is determined not to be able to be retransmitted. If the frame can be retransmitted, an advance is made to step S118. On the other hand, if the frame cannot be retransmitted, a return is made to step S101 to establish the connection again.

In step S118, if the number of times of the frame transmission is less than the maximum trial number of times, an advance is made to step S119, and if it has reached that maximum value, the transmission of this frame is abandoned, to return to step S101 and establish the connection again.

Preferably, the maximum trial number of times at this step of S118 is smaller than that in the case of communication by use of only ACK/BA (second communication mode).

In step S119, the wireless communication apparatus 1 retransmits the frame in accordance with the ACK/BA policy.

Although it is assumed that a return should be made to the connection establishment phase if the frame retransmission is determined to be impossible at step S117, a new frame may be transmitted subsequently in accordance with the ACK/BA policy. Further, a return may be made to the connection establishment phase if no ACK/BA is returned in response to the new frame transmitted in accordance with the ACK/BA policy. Still further, frame transmission may be performed in accordance with the NACK/NBA policy if the channel status is considered to have recovered because ACK/BA was returned in response to the new frame transmitted in accordance with the ACK/BA policy.

By using such a method, the wireless communication apparatus 1 transmits frames in accordance with the ACK/BA policy if the number of times NACK/NBA has not been returned in a row in response to the frames transmitted in accordance with the NACK/NBA policy reaches a predetermined value. Based on whether ACK/BA is returned, it is possible to confirm whether the channel status is good.

Next, a description will be given of timing at which switchover is made from the NACK/NBA policy to the ACK/BA policy. Although the response type is switched to ACK/BA if NACK/NBA has not been returned the predetermined number of times in a row, actually, the switchover timing is important.

For example, if a frequency at which switchover is made from the NACK/NBA policy to the ACK/BA policy is low, there may be some cases where frame retransmission is impossible because less recent ones of the frames transmitted in a row in accordance with the NACK/NBA policy are not left in the transmission buffer immediately after the response type is switched to the ACK/BA policy. On the other hand, if the NACK/NBA policy is switched to the ACK/BA policy frequently, this problem does not occur; however, it may be difficult to have effects of improving access efficiencies because of the response type being NACK/NBA.

Taking this into account, a description will be given of the timing at which the NACK/NBA policy is switched to the ACK/BA policy. It is to be noted that a description will be given of a case where packet losses are not tolerated. The points of timing at which the NACK/NBA policy is switched to the ACK/BA policy can be roughly divided into the following two.

One is timing based on a sequence number that can be set to an SN field in the transmission frame. By assigning a sequence number to each of the frames when they are transmitted, the reception side can adjust the sequence of the received frames. Typically, the sequence number is described in a field allocated in the header of a transmission frame. If this field has, for example, a size of one byte, the sequence numbers can be assigned sequentially up to 255. When the frames are to be transmitted one by one, the response type switchover control unit 43 switches the response type when the count value of the counter 44 has reached 255. Further, when x number of frames (x is an integer of 2 or larger) are to be transmitted in block, the response type switchover control unit 43 switches the response type when the count value of the counter 44 has reached 255/x.

By switching the response type at such frequencies, merits will be given of being able to assign different sequence numbers to transmission frames and retransmit the frames in distinction from each other.

The other is timing based on the size of the transmission buffer. If the transmission buffer size is smaller than a value of the SN field, the response type is switched to the ACK/BA policy at timing at which the buffer size reaches its upper limit. Actually, there are high possibilities that the switchover timing may be set differently with the configuration of the transmission buffer.

For example, in a case where the number of the transmission buffers is only one, if the transmission buffer is filled with frames to its upper limit and then the response type is switched to the ACK/BA policy to transmit the frames and determine whether ACK/BA is returned in response, transmission frames newly received from the higher-layer processing unit 50 in the meantime cannot be stored in the transmission buffer. Therefore, the response type will be switched if the transmission buffer is filled with transmission frames up to its predetermined proportion based on a frequency at which the transmission frames are received from the higher-layer processing unit 50.

Further, in a case where the number of the transmission buffers used is more than one, for example, two, control is conducted so that the response type may be switched if one of the transmission buffers is filled. By thus switching the response type at such a frequency as not to overflow the transmission buffer, merits may be given of being able to retransmit frames starting from the one next to the frame successfully transmitted before the occurrence of communication cutoff (worsening of the channel status), if any.

Further, it may be possible to select one of these two points of timing, whichever gives a shorter interval for response type switchover.

Still further, in a case where the size of a reception buffer is notified of from the reception side during set conditions etc. are being transferred in the connection establishment phase, it may be possible to select the shortest one of a switchover interval for the response type based on the SN field, a switchover interval for the response type based on the transmission buffer size, and a switchover interval for the response type based on the reception buffer size on the reception side. In general, the transmission buffer size and the reception buffer size are determined in design peculiar to the device employed, so that the timing may be effective if the conditions of the partner devices are taken into account.

In such a manner, the wireless communication apparatus of the present embodiment can improve access efficiencies through communication in accordance with the NACK/NBA policy, while simultaneously switching the response type to the ACK/BA policy if NACK/NBA is not returned a predetermined number of times in a row to thus confirm the channel status based on the presence/absence of ACK/BA, thereby following a sudden change in channel status.

Although in the above embodiment, the counter 44 has determined the presence/absence of NACK/NBA in response to the transmission of a frame for which the NACK/NBA response type is set, the transmission unit 41 may post frame transmission timing and the thus set response type to the reception unit 42 so that the reception unit 42 can determine the presence/absence of the response to manage a result of this determination at the counter 44.

(Second Embodiment)

A description will be given of a wireless communication apparatus according to a second embodiment of the present invention. The wireless communication apparatus according to the present embodiment has the same constitution as that according to the first embodiment shown in FIG. 10. The wireless communication apparatus according to the present embodiment is different from the wireless communication apparatus according to the first embodiment in timing at which the response type is switched from the NACK/NBA policy to the ACK/BA policy.

In contrast to the case of the first embodiment in which packet losses are not tolerated, the present embodiment tolerates packet losses. The points of timing at which the NACK/NBA policy is switched to the ACK/BA policy can be roughly divided into the following two.

One is timing based on a request from the higher layer such as an application that consecutive packet losses should be tolerated. For example, switchover timing may be set to tolerate up to such kinds of consecutive packet losses as to somewhat degrade the image quality in the case of, for example, transfer of a moving image.

For example, in streaming, packet losses can be tolerated but retardation may not be done; therefore, the frame retransmission timing becomes important. If the response type is switched and frames are retransmitted using a transmission buffer size as a trigger as in the case of the first embodiment, the response type will not be switched until the transmission buffer is filled with the frames.

If the transmission buffer size is large, the frame retransmission is retarded, which is undesirable in streaming. On the other hand, the transmission buffer size may possibly be reduced to switch the response type frequently in confirmation of communication status, which is undesirable in efficiency.

Instead, for example, as in the case of streaming where packet losses can be tolerated to some extent, the response type may be switched based on the degree of tolerance, which improves efficiencies. For example, in a case where it is tolerated even if up to five packets cannot be received in a row, each time the five packets are transmitted, the response type will be switched from the NACK/NBA policy to the ACK/BA policy. Then, if ACK/BA is received, frames will be transmitted in accordance with the NACK/NBA policy again.

The other is timing based on a possibility that frame transmission may be successful. When communication is started, before transmitting frames in accordance with the NACK/NBA policy, they are transmitted in accordance with the ACK/BA policy to calculate the possibility that the frames can be successfully transmitted in a row. The calculated possibility is used to obtain an extent in which the consecutive transmission in accordance with the NACK/NBA policy will not have a heavy influence, thereby switching the response type.

The present embodiment thus utilizes the degree of tolerance of packet losses as timing of switching the response type. Further, similar to the first embodiment, it is possible to improve access efficiencies and follow a sudden change in channel status.

(Third Embodiment)

A description will be given of a wireless communication apparatus according to the third embodiment of the present invention. The wireless communication apparatus according to the present embodiment has the same constitution as that according to the first embodiment shown in FIG. 10. However, a transmission unit 41 is assumed to be capable of adjusting its transmission rate. Further, the operating state of the wireless communication apparatus according to the present embodiment has a connection establishment phase for establishing connection with communication partner devices, a transfer rate confirmation phase for determining an optimal transmission rate, and a data transfer phase for transmitting data as switching the response type.

In the connection establishment phase, the connect request signal (C_req) is transmitted to then determine whether the connect response signal (C_acc) is received. If C_acc is received, it is determined that connection with the communication partner device has been established. Further, ACK is transmitted to the communication partner device to notify also the partner device of the establishment of connection.

Typically, upon the establishment of connection, such signals as C_req and C_acc are transmitted at a lower setting of the transmission rate. Therefore, in the transfer rate confirmation phase, the transmission rate is controlled so that the highest possible value thereof may be selected.

If NACK/NBA is used immediately after the connection is established, a periodic response cannot be obtained from the reception device, so that the rate control may be difficult or impossible to conduct. Accordingly, in the transfer rate confirmation phase, ACK/BA is used in communication to thereby detect whether a desired transmission rate can be obtained stably, thereby seeking such a transmission rate as to enable stable communication.

If a target error rate can be achieved by determining the transmission rate that enables stable communication in the transfer rate confirmation phase, an advance is made to the data transfer phase which is based on NACK/NBA. In the data transfer phase, frames are transmitted and received at a high efficiency.

Figure 11:
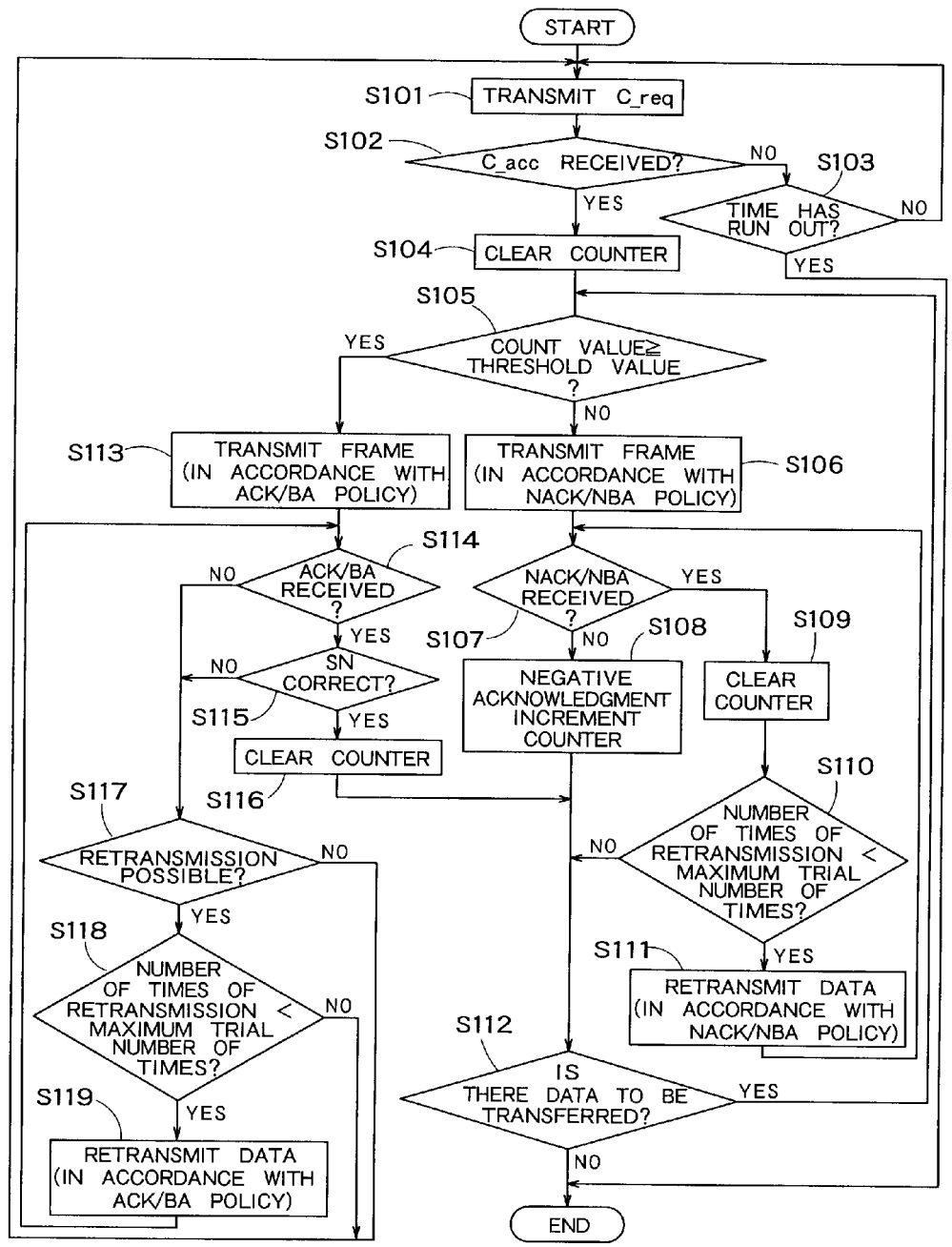
FIG. 11 is an explanatory flowchart of a wireless communication method according to the first embodiment.
Figure 12:
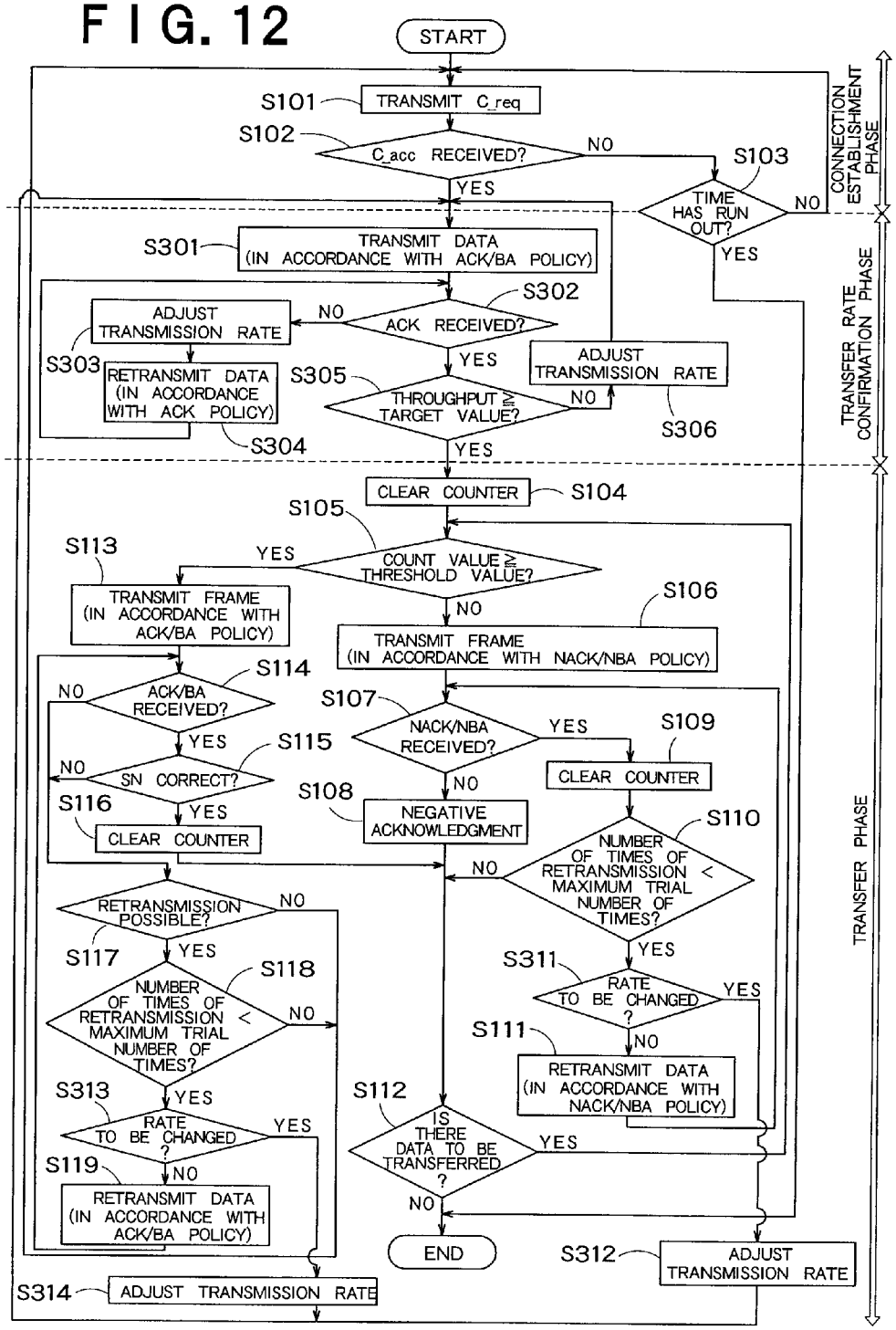
FIG. 12 is an explanatory flowchart of a wireless communication method according to a third embodiment.

FIG. 12 shows a flowchart of a wireless communication method by use of the wireless communication apparatus of the present embodiment. Since steps S101-S103 of the flowchart of the wireless communication method according to the first embodiment shown in FIG. 11 correspond to the connection establishment phase, identical reference numerals are given to identical components, and repetitive description on the identical components will be omitted.

A description will be given here of the transfer rate confirmation phase (steps S301 to S306).

In step S301, a frame is transmitted in accordance with the ACK/BA policy.

In step S302, if ACK/BA is received, an advance is made to step S305 and, if it is not received, an advance is made to step S303.

In step S303, the transmission unit 41 adjusts the transmission rate.

In step S304, the frame is transmitted in accordance with the ACK/BA policy, to return to step S302.

In step S305, if the throughput is equal to or more than a target value, an advance is made to the data transfer phase (step S104), and if it is less than the target value, an advance is made to step S306.

In step S306, the transmission unit 41 adjusts the transmission rate, to return to step S301.

It is to be noted that in the transfer rate confirmation phase, basically, the maximum trial number of times will not be set for the response signal so that retransmission may be repeated.

Since step S104 and the subsequent steps of the flowchart of the wireless communication method according to the first embodiment shown in FIG. 11 correspond to the data transfer phase, identical reference numerals are given to identical components, and repetitive description on the identical components will be omitted.

However, processing between steps S110 and S111 and that between steps S118 and S119 include determination steps (S311 and S313 respectively) to determine whether the transmission rate should be changed. If the transmission rate is to be changed, transmission rate is adjusted (S312, S314) and a return is made to step S301.

In such a manner, by the wireless communication apparatus according to the present embodiment, the processing of establishing connection between the transmission side and the reception side can be followed by an additional phase of using ACK/BA, thereby enabling selecting the optimal transmission rate by means of transmission rate control and making a determination as to whether stable communication can be obtained.

It is thus possible to take into account transmission rate control, which is difficult to apply to the NACK/NBA, and also possible to employ the NACK/NBA response type in a communication state suitable for the NACK/NBA response.

(Fourth Embodiment)

Figure 13:
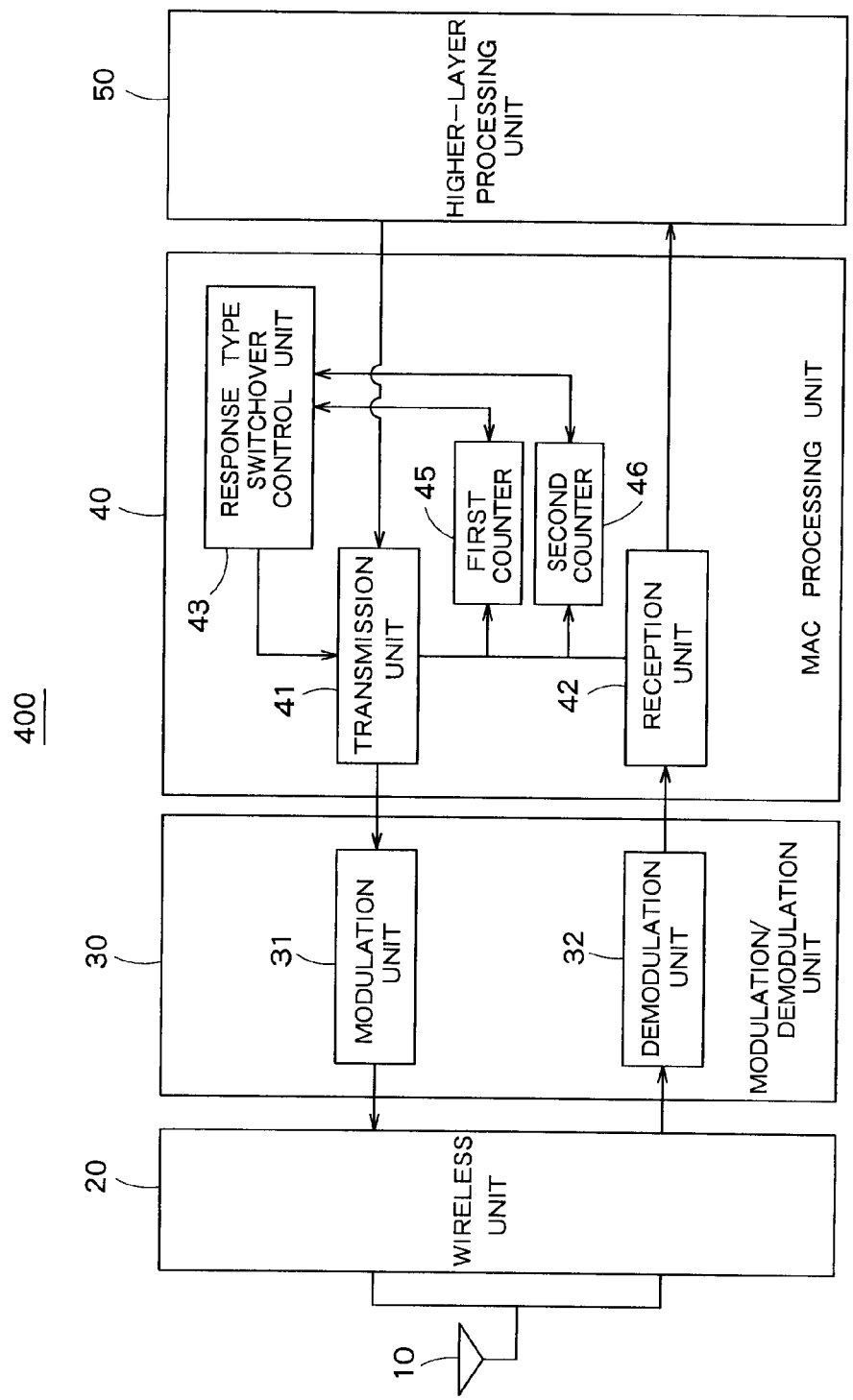
FIG. 13 is a schematic constitution diagram of a wireless communication apparatus according to a fourth embodiment.

FIG. 13 shows the schematic constitution of a wireless communication apparatus according to the fourth embodiment of the present invention. The wireless communication apparatus 400 according to the present embodiment is of the same constitution as that of the wireless communication apparatus 1 according to the first embodiment except that the counter 44 of the wireless communication apparatus 1 has been removed and a first counter 45 and a second counter 46 have been equipped instead.

The first counter 45 is used to count the number of times NACK/NBA is received in a row in response to frame transmission in accordance with the NACK/NBA policy. The second counter 46 is used to count the number of times ACK/BA is received in a row in response to frame transmission in accordance with the ACK/BA policy.

A response type switchover control unit 43 switches the response type based on the count values of the first counter 45 and the second counter 46.

In the first and second embodiments, if NACK/NBA has not been received the predetermined number of times in a row in response to frame transmission in accordance with the NACK/NBA policy, the frame transmission would be retried after switching the response policy to the ACK/BA policy. If, as a result, ACK/BA has been obtained, it would be switched to the NACK/NBA policy again.

On the other hand, in the present embodiment, if NACK/NBA is received in a row during the transmission of frames in accordance with the NACK/NBA policy, the response type is switched to ACK/BA.

If ACK/BA is received after the response type is switched to ACK/BA, NACK/NBA is not immediately recovered. For example, if ACK/BA is received a plurality of number of times in a row or error-free BA is received the plurality of number of times in a row, the response type is switched to NACK/NBA.

In a case where NACK/NBA occurs successively, that is, the channel status tends to get worse, channel disconnection may be estimated by switching the response type to ACK/BA so that the channel-disconnected state difficult to determine in a condition where the NACK/NBA response type remains unchanged can be determined clearly. Further, in a case where ACK/BA occurs successively, that is, the channel status is estimated to have got better, it is switched back to NACK/NBA to improve the efficiencies of communication.

Figure 14:
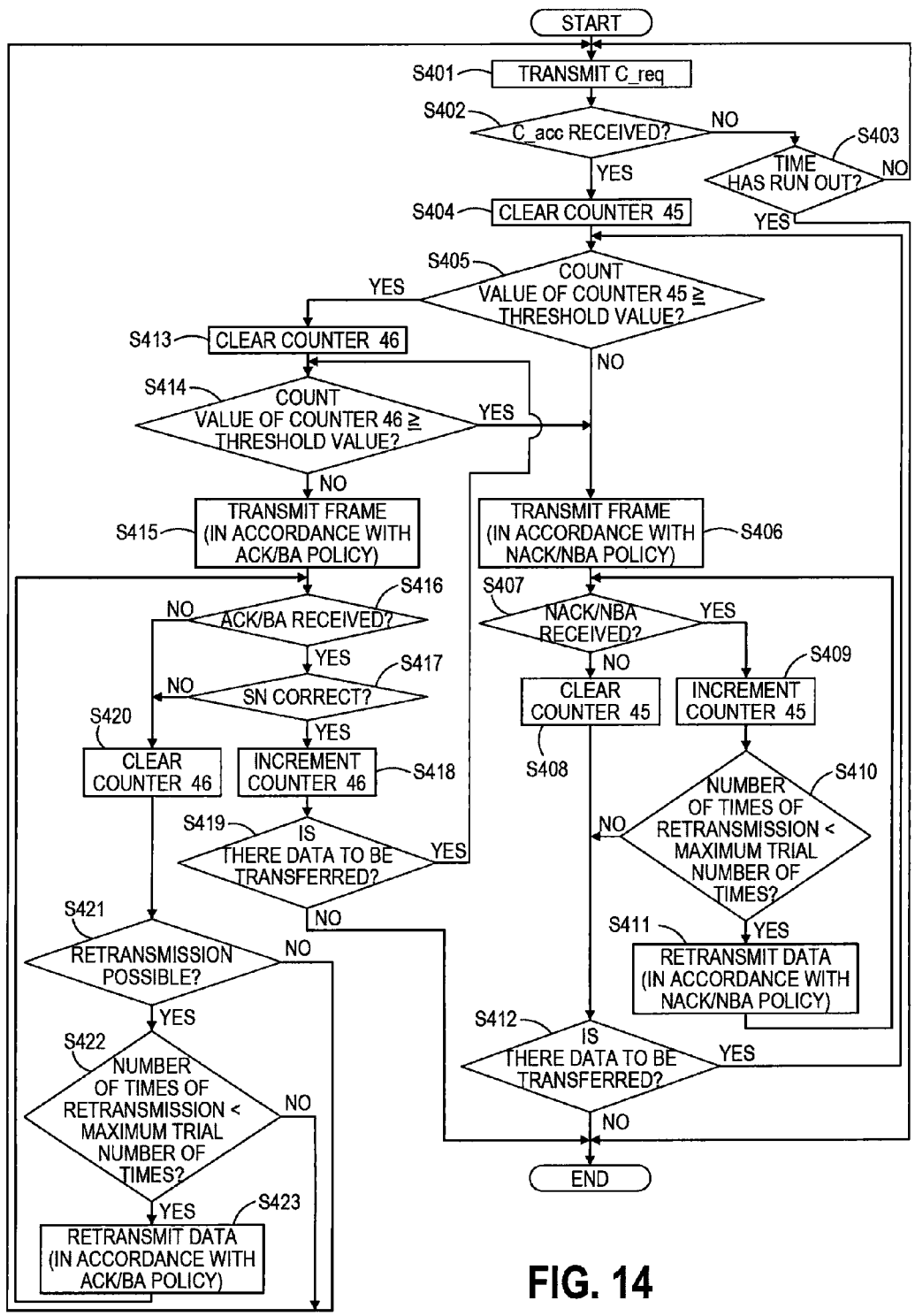
FIG. 14 is an explanatory flowchart of a wireless communication method according to the fourth embodiment.

A description will be given of a wireless communication method according to the present embodiment with reference to a flowchart shown in FIG. 14.

In step S401, the wireless communication apparatus 400 transmits the connect request signal (C_req).

In step S402, if the wireless communication apparatus 400 has received the connect response signal (C_acc), connection is established to go to step S404. If the wireless communication apparatus 400 has not received the connect response signal (C_acc), an advance is made to step S403.

In step S403, if time is yet to run out, a return is made to step S401, and if time has run out, the processing ends.

In step S404, the count value of the counter 45 is cleared (set to 0).

In step S405, if the count value of the counter 45 is less than a threshold value, an advance is made to step S406, and if it is equal to or more than the threshold value (has reached the threshold value), an advance is made to step S413.

In step S406, the wireless communication apparatus 400 transmits a frame in accordance with the NACK/NBA policy.

In step S407, if the wireless communication apparatus 400 has received NACK/NBA within a predetermined lapse of time since the frame transmission, an advance is made to step S409, and if it has not received NACK/NBA, an advance is made to step S408.

In step S408, the count value of the counter 45 is cleared.

In Step S409, the frame transmission is considered to have failed, to increment the counter 44 (increase count value by 1).

In step S410, if the number of times of the frame transmission is less than a maximum trial number of times, an advance is made to step S411, and if it has reached that maximum value, the transmission of this frame is abandoned, to go to step S412.

In step S411, the wireless communication apparatus 400 retransmits the frame in accordance with the NACK/NBA policy.

In step S412, if there is data to be transferred, a return is made to step S405, and if there is no data to be transferred, the processing ends.

In step S413, the count value of the counter 46 is cleared.

In step S414, if the count value of the counter 46 is less than a threshold value, an advance is made to step S415, and if it is equal to or more than the threshold value (has reached the threshold value), an advance is made to step S406.

In step S415, the wireless communication apparatus 400 switches the response type to the ACK/BA policy and then transmits the frame.

In step S416, if the wireless communication apparatus 400 has received ACK/BA within the predetermined lapse of time since the frame transmission at step S415, an advance is made to step S417, and if it has not received ACK/BA, an advance is made to step S420.

In step S417, if a sequence number is described in ACK/BA, a determination is made as to whether the sequence number is correct. For example, a determination is made as to whether the sequence number described in ACK agrees with the most recent one of the sequence numbers assigned to the frames transmitted by the wireless communication apparatus 400.

If the sequence number is correct, an advance is made to step S418, and if it is not correct, an advance is made to step S420.

If no sequence number is described in ACK, this step is omitted.

In step S418, the counter 46 is incremented (its count value is increased by 1).

In step S419, if there is data to be transferred, a return is made to step S414, and if there is no data to be transferred, the processing ends.

In step S420, the count value of the counter 46 is cleared.

In step S421, a determination is made as to whether the frame can be retransmitted. For example, if the frame is stored in the transmission buffer, it is determined to be able to be retransmitted, and if the frame is erased already, it is determined not to be able to be retransmitted. If the frame can be retransmitted, an advance is made to step S422.

On the other hand, if the frame cannot be retransmitted, a return is made to step S401 to establish the connection again. A return may be made to step S415 to continue the transmission of a new frame in accordance with the ACK/BA policy.

In step S422, if the number of times of the frame retransmission is less than the maximum trial number of times, an advance is made to step S419, and if it has reached that maximum value, the transmission of this frame is abandoned, to return to step S401 and establish the connection again.

Preferably, the maximum trial number of times at this step of S422 is smaller than that in the case of communication by use of only ACK/BA (second communication mode).

In step S423, the wireless communication apparatus 400 retransmits the frame in accordance with the ACK/BA policy.

In such a manner, in the present embodiment, in a case where NACK/NBA occurs successively, that is, the channel status tends to get worse, channel disconnection may be estimated by switching the response type to ACK/BA so that the channel-disconnected state difficult to determine in a condition where the NACK/NBA response type remains unchanged can be determined clearly. Further, in a case where ACK/BA occurs successively, that is, the channel status is estimated to have got better, it can be switched back to NACK/NBA to improve the efficiencies of communication.

Thus, frame transmission in accordance with the NACK/NBA policy is effective in a case where the channel status is so good that responses can be omitted. On the other hand, in a situation in which responses occur every time, the efficiency degrades to much the same extent as or more than the case of using ACK/BA. Further, the NBA or BA needs bitmap management for response format creation on the side of the reception side device, thus increasing a quantity to be processed.

If extremely high access efficiencies are not required, ACK can be used to omit processing such as the bitmap management. However, in a case of transmitting a plurality of frames, the basic ACK will be transmitted only if those multiple frames are all transmitted successfully. Accordingly, if ACK is received, all the frames are to be retransmitted even if only one of them is erroneous, thus deteriorating the transfer efficiency significantly.

On the other hand, in the case of the ACK response having the function of notifying of a sequence number (SN), if a plurality of frames are transmitted, the number of the most recent one of the successfully communicated frames is notified of to the transmission side, so that the transmission side needs to retransmit only the frames having the posted number and the subsequent. Therefore, the transfer efficiencies can be improved more than the case of employing the ordinary ACK.

Therefore, in the fourth embodiment, in the midst of frame transmission in accordance with the NBA policy, if errors occur frequently and NBA is received almost each time and the transfer efficiencies can be degraded to some degree, the response type may be switched to the ACK having the function to notify of the SN. Thus, the quantity to be processed on the side of the frame reception can be reduced.

The wireless communication method according to the fourth embodiment may include the transfer rate confirmation phase (steps S301 to S306) shown in FIG. 12.

At least part of the wireless communication apparatus described in the above embodiments may be implemented in either hardware or software. When implemented in software, a program that realizes at least part of functions of the wireless communication apparatus may be stored on a recording medium such as a flexible disk or CD-ROM and read and executed by a computer. The recording medium is not limited to a removable recording medium such as a magnetic disk or optical disk, but may be a non-removable recording medium such as a hard disk device or memory.

The program that realizes at least part of the functions of the wireless communication apparatus may be distributed through a communication line (including wireless communications) such as the Internet. Further, the program may be encrypted, modulated, or compressed to be distributed through a wired line or wireless line such as the Internet or to be distributed by storing the program on a recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
a transmission unit that transmits a transmit signal in a condition where either acknowledgement policy or negative acknowledgement policy is set therein;
a reception unit that receives a positive acknowledgment signal or a negative acknowledgment signal in response to the transmission signal;
a counter that counts the number of times the reception unit has not received the negative acknowledgment signal in response to the transmission signal in which the negative acknowledgement policy is set; and
a control unit that causes the transmission unit to set the negative acknowledgement policy if a count value of the counter is less than a predetermined value and, if the count value is equal to or larger than the predetermined value, causes the transmission unit to set the acknowledgement policy.

2. The apparatus according to claim 1, wherein if the reception unit has received the positive acknowledgment signal in response to the transmission signal in which the acknowledgement policy is set, the control unit controls the transmission unit so that the transmission unit sets the negative acknowledgement policy and the count value of the counter is cleared.

3. The apparatus according to claim 2, wherein if a sequence number described in the positive acknowledgment signal disagrees with the sequence number described by the transmission unit in the most recent transmission signal, the transmission unit retransmits the transmission signal in which the acknowledgement policy is set.

4. The apparatus according to claim 3, wherein the transmission unit sets maximum trial number of times for the retransmission to a value smaller than the maximum trial number of times in a case of transmitting the transmission signal in a condition where only the acknowledgement policy is set thereto.

5. The apparatus according to claim 1, wherein if the negative acknowledgment signal is received, the count value of the counter is cleared.

6. The apparatus according to claim 1, wherein supposing that a maximum value of the sequence number that can be described in a sequence number field of the transmission signal is a (a is a natural number) and the number of frames to be transmitted by the transmission unit at a time is b (b is a natural number), the predetermined value is a/b or less.

7. The apparatus according to claim 1, further comprising:
a higher-layer processing unit that generates a transmission frame and gives it to the transmission unit; and
at least one buffer that stores the transmission frame,
wherein the predetermined value is determined based on a size of the transmission frame and the size of the buffer.

8. The apparatus according to claim 1, further comprising:
a higher-layer processing unit that generates a transmission frame and gives it to the transmission unit; and
a buffer that stores the transmission frame,
wherein the predetermined value is determined based on a size of the transmission frame, the size of the buffer, and the number of the transmission frames generated by the higher-layer processing unit in a lapse of time from transmission of the transmission signal in which the acknowledgement policy is set up to reception of the positive acknowledgment signal.

9. The apparatus according to claim 1, further comprising:
a higher-layer processing unit that generates a transmission frame and gives it to the transmission unit; and
a buffer that stores the transmission frame,
wherein the predetermined value is not larger than the smaller one of a first value calculated based on a size of the transmission frame and the size of the buffer and a second value calculated based on the maximum value of the sequence number that can be described in the sequence number field of the transmission signal and the number of the frames transmitted by the transmission unit at a time.

10. The apparatus according to claim 9, wherein:
the reception unit acquires the size of the reception buffer of other wireless communication apparatus when connection with it is established; and
the predetermined value is not larger than the smallest value of the first value, the second value, and a third value calculated based on the size of the transmission frame and the size of the reception buffer.

11. The apparatus according to claim 1, wherein the predetermined value is determined using a tolerated number of successive packet losses based on a request from an application.

12. The apparatus according to claim 1, wherein the predetermined value is determined based on a possibility that the reception unit receives the positive acknowledgment signal in a row in response to the transmission signal in which the acknowledgement policy is set.

13. The apparatus according to claim 1, wherein:
the transmission unit can adjust a transmission rate; and
if the transmission unit is to adjust the transmission rate, the control unit controls the transmission unit so that the transmission unit sets the acknowledgement policy.

14. A wireless communication apparatus comprising:
a transmission unit that transmits a transmission signal in a condition where either acknowledgement policy or negative acknowledgement policy is set therein;

a reception unit that receives a positive acknowledgment signal or a negative acknowledgment signal in response to the transmission signal;

a first counter that counts the number of times the reception unit has received the negative acknowledgement signal in response to the transmission signal in which the negative acknowledgement policy is set;

a second counter that counts the number of times the reception unit has received the positive acknowledgment signal in response to the transmission signal in which the acknowledgement policy is set; and a control unit that causes the transmission unit to set the negative acknowledgement policy if a count value of the first counter is less than a first predetermined value or the count value of the second counter is a second predetermined value or larger and, if the count value of the first counter is the first predetermined value or larger and the count value of the second counter is less than the second predetermined value, causes the transmission unit to set the acknowledgement policy.

15. The apparatus according to claim 14, wherein if the reception unit has not received the negative acknowledgment signal in response to the transmission signal in which the negative acknowledgement policy is set, the count value of the first counter is cleared.

16. The apparatus according to claim 14, wherein if the reception unit has not received the positive acknowledgment signal in response to the transmission signal in which the acknowledgement policy is set, the count value of the second counter is cleared.

17. The apparatus according to claim 14, wherein if a sequence number described in the positive acknowledgment signal disagrees with the sequence number described by the transmission unit in the most recent transmission signal, the count value of the second counter is cleared and the transmission unit retransmits the transmission signal in which the acknowledgement policy is set.

18. A wireless communication method comprising:

transmitting a first signal in a condition where negative acknowledgement policy is set as a response type therein;

counting the number of times a negative acknowledgment signal has not been received in a row in response to the first signal;

if the number of times has reached a predetermined value, transmitting a second signal in a condition where acknowledgement policy is set as the response type therein;

if a positive acknowledgment signal is received in response to the second signal, transmitting a third signal in a condition where negative acknowledgement policy is set as the response type therein; and if the positive acknowledgment signal is not received in response to the second signal, retransmitting the second signal in a condition where acknowledgement policy is set as the response type therein.

* * * * *